R. E. CARTZDAFNER.
DUMP CAR.
APPLICATION FILED NOV. 23, 1918.

1,375,564.

Patented Apr. 19, 1921.
2 SHEETS—SHEET 2.

UNITED STATES PATENT OFFICE.

ROY E. CARTZDAFNER, OF PASSAIC, NEW JERSEY, ASSIGNOR TO MAGOR CAR CORPORATION, OF NEW YORK, N. Y., A CORPORATION OF NEW YORK.

DUMP-CAR.

1,375,564.   Specification of Letters Patent.   Patented Apr. 19, 1921.

Original application filed October 27, 1916, Serial No. 128,110. Divided and this application filed November 23, 1918. Serial No. 263,826.

*To all whom it may concern:*

Be it known that I, ROY E. CARTZDAFNER, a citizen of the United States, and a resident of Passaic, in the county of Passaic and State of New Jersey, have invented an Improvement in Dump-Cars, of which the following is a specification.

This invention relates to dump cars, and with regard to certain more specific features, to side-door operating mechanism. This application is a division of my application, Serial No. 128,110, filed October 27, 1916.

The principal object of the invention claimed in the present application is to provide an improved linkage and mechanism for opening the doors or sides of a dump car and lifting them above the plane of the car body automatically as the car swings into dumping position and automatically restoring the door to closed position during the righting movement and locking it securely closed while the car is in normal position. Other objects will be in part obvious and in part pointed out hereinafter.

The invention accordingly comprises the features of construction and operation, combinations of elements, and arrangement of parts which are exemplified in the structure hereinafter described and the scope of the application of which will be indicated in the following claim.

Figure 1:
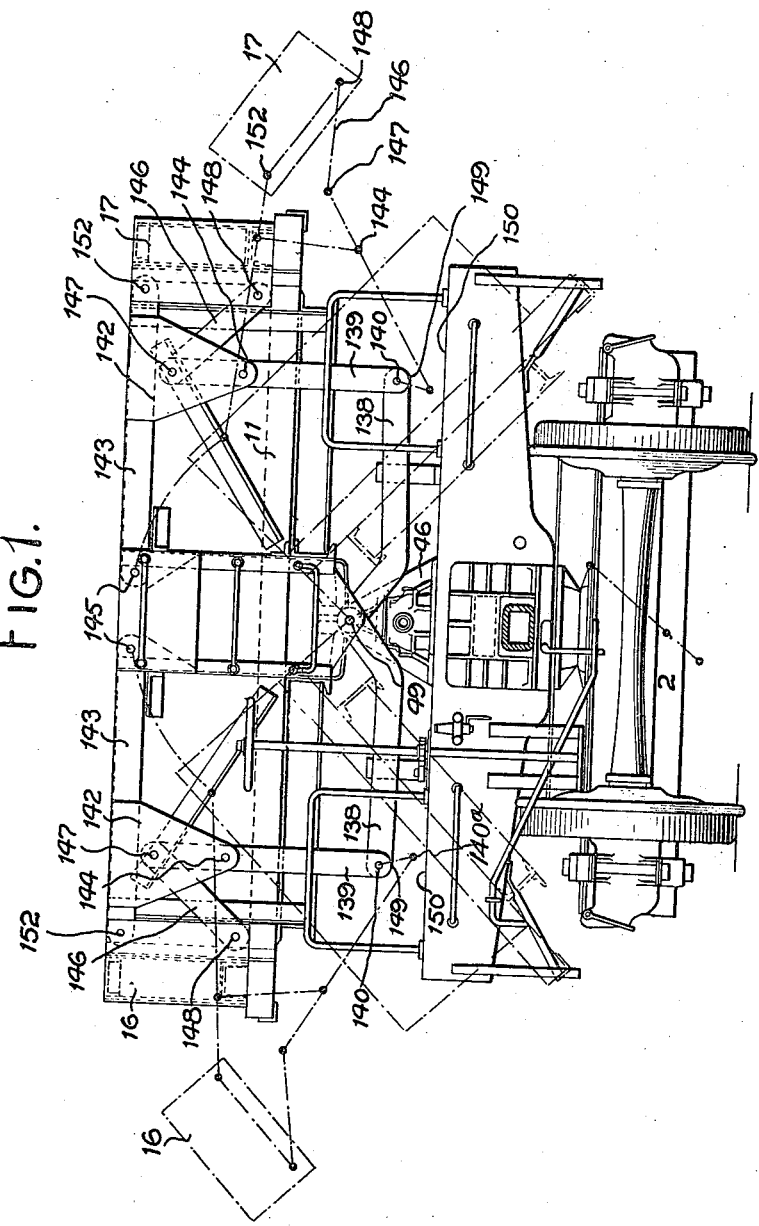

In the accompanying drawings, in which is shown one of various possible embodiments of this invention, Figure 1 is an end elevation of a dump car in its normal or horizontal position, having a door operating mechanism constructed in accordance with the present invention.

Figure 2:
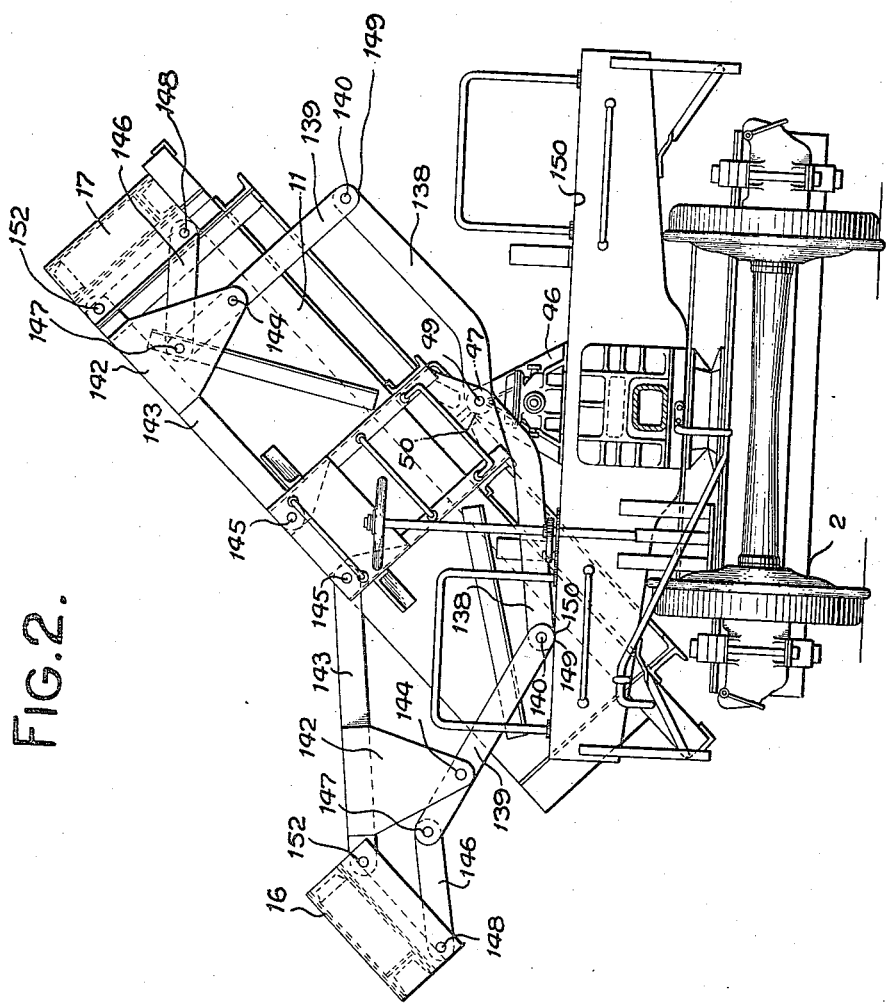

Fig. 2 is a similar view showing the car in its position for dumping toward the left.

Referring to the accompanying drawings, there is illustrated a dump car comprising a tilting car body 11 pivotally mounted on a suitable frame carried by trucks, one of which is shown at 2. The car body is mounted to tilt for dumping to either side about alined pivot pins 49 supported in standards 46 forming parts of the under-frame. The pins 49 have bearing in plates or members 50 secured to and which support the car body. Suitable means such as chains (not shown) may be provided for limiting the tilting movement of the body. The tilting car body comprises fixed ends, one of which appears in the drawings, and two movable sides or doors 16, 17, so supported and arranged that upon dumping to one side or the other the corresponding door is moved automatically upward and outwardly and relatively away from the bottom of the car body to permit a free dumping of the material carried, and on return of the car body to horizontal position the door is returned automatically to closed position.

The door supporting and operating mechanism comprises similar arrangements of devices on the two opposite ends of each door. One will be described. A link or top bar 143 extends horizontally along the top of the car end and is pivoted to the car body at 145 and to the upper part of the door at 153, thus holding the upper part of the door against movement laterally outward and constraining it to move in an arc about the pivot 145. A combination of links connects to and controls the movement of the lower part of the door to permit and cause a movement upward and laterally outward relative to the car body during dumping. Horizontal tie bar 138 is pivoted at its inner end to the car body at the axis of oscillation and at its outer end is connected to the lower end of a straight dumping iron 139. The upper end of the dumping iron is connected to a pivot 148 near the lower edge of the door by a straight link 146 pivoted thereto at 147. The straight dumping iron 139 is pivotally connected intermediate its ends to a gusset plate 142 rigidly secured to the top bar 143 and extending along said top bar and close to the pivot 152 to provide a strong and rigid construction to withstand the strain of lifting the door and prevent bending of the link 143.

In operation as the car is tilted for dumping the lower end 149 of the dump car engages an abutment 150 on the under-frame and is therefore held against further movement during the continued tilting movement of the car body. The door by this action is held against further downward movement with the car body and is in effect lifted relatively away from the car body and at the same time moved outwardly, as indicated in Fig. 2.

It is to be noted that in the arrangement shown the greatest strains, those which occur during the first part of the lifting movement of the car door, are taken by the links in tension and compression substantially in straight lines along the lengths of the links. The gusset plate 142 is secured to the link 143 for a substantial extent along the length of the link and relatively close to the pivot 152 to provide a strong construction to resist this shock.

When the car body is tilted the link 139 engages the abutment 150 with more or less of a shock and during the first part of the movement of the door the material carried pressing against the door adds a certain resistance to movement of the door. It is for this reason that the door operating mechanism must be of a type to resist severe strains upon dumping.

I claim as my invention:

In apparatus of the character described, in combination, a car body provided with a movable door, an under-frame on which the body is pivotally mounted, a link mechanism controlling the movement of the door comprising a straight compression dumping bar, a link pivoted coaxially with the axis of the car body and connected to the lower end of the dumping bar, a top bar pivotally connected at one end to the car body and at the other end to the upper portion of the door, a link connecting the top of the dumping bar and the lower portion of the door, and a gusset plate rigidly secured to the top bar and depending therefrom to the lower end of which the dumping bar is pivotally connected at a point intermediate its ends, substantially as and for the purpose described.

In testimony whereof I have signed my name to this specification this 22nd day of November, 1918.

ROY E. CARTZDAFNER.